US012769175B2

(12) United States Patent
Lundy et al.

(10) Patent No.: US 12,769,175 B2
(45) Date of Patent: Oct. 20, 2026

(54) ELECTRO-OPTIC ASSEMBLY WITH A MICRO-PHOTODIODE LIGHT SENSOR

(71) Applicant: Gentex Corporation, Zeeland, MI (US)

(72) Inventors: Eric S. Lundy, Holland, MI (US); Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 226 days.

(21) Appl. No.: 18/733,092

(22) Filed: Jun. 4, 2024

(65) Prior Publication Data

US 2024/0402560 A1 Dec. 5, 2024

Related U.S. Application Data

(60) Provisional application No. 63/471,016, filed on Jun. 5, 2023.

(51) Int. Cl.

| | |
|---|---|
| ***G02F 1/157*** | (2006.01) |
| ***B60J 3/06*** | (2006.01) |
| ***B60R 1/08*** | (2006.01) |
| ***G02F 1/1335*** | (2006.01) |
| ***G02F 1/1514*** | (2019.01) |
| ***G02F 1/155*** | (2006.01) |
| ***G02F 1/163*** | (2006.01) |

(52) U.S. Cl.

CPC ................ *G02F 1/157* (2013.01); *B60J 3/06* (2013.01); *B60R 1/088* (2013.01); *G02F 1/133553* (2013.01); *G02F 1/155* (2013.01); *G02F 1/163* (2013.01); *G02F 2001/15145* (2019.01)

(58) Field of Classification Search

CPC ............ B60R 1/088; B60R 2001/1215; B60R 2001/1246; G02F 2001/15145; G02F 1/163; G02F 1/157; G02F 1/155

See application file for complete search history.

(56) References Cited

U.S. PATENT DOCUMENTS 6,133,615 A * 10/2000 Guckel .................. H10F 39/80 257/466
2006/0268416 A1 11/2006 Nixon et al.
2019/0163013 A1 5/2019 Cammenga et al.

(Continued)

FOREIGN PATENT DOCUMENTS

CN 218273018 U 1/2023

*Primary Examiner* — Alexander P Gross

(74) *Attorney, Agent, or Firm* — Price Heneveld LLP; Brian James Brewer

(57) ABSTRACT

An electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity. A first electrode layer is located on the second surface, and a second electrode layer is located on the third surface. A reflective element is disposed behind the electro-optic medium, opposite the first substrate. A photodiode light sensor is configured to detect a glare from a light, and a control system is configured to adjust an applied electrical potential to the electro-optic medium as a result of the detected glare.

16 Claims, 6 Drawing Sheets

(56) References Cited

U.S. PATENT DOCUMENTS

| | | | |
|---|---|---|---|
| 2020/0089072 | A1* | 3/2020 | Kubo ...................... G02F 1/163 |
| 2021/0323476 | A1 | 10/2021 | Saenger Nayver et al. |
| 2022/0277706 | A1 | 9/2022 | Wang et al. |

* cited by examiner

ELECTRO-OPTIC ASSEMBLY WITH A MICRO-PHOTODIODE LIGHT SENSOR

CROSS-REFERENCE TO RELATED APPLICATION

This application claims priority to and the benefit under 35 U.S.C. § 119(e) of U.S. Provisional Application No. 63/471,016, filed on Jun. 5, 2023, entitled “ELECTRO-OPTIC ASSEMBLY WITH A MICRO-PHOTODIODE LIGHT SENSOR,” the disclosure of which is hereby incorporated herein by reference in its entirety.

FIELD OF THE DISCLOSURE

The present disclosure generally relates to an electro-optic assembly, and more particularly to an electro-optic assembly including a micro-photodiode light sensor.

SUMMARY OF THE DISCLOSURE

According to one aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface, and a second electrode layer is located on the third surface. A reflective element is disposed behind the electro-optic medium, opposite the first substrate. A photodiode light sensor is configured to detect a glare from a light, and a control system is configured to adjust the applied electrical potential to the electro-optic medium by the first and second electrodes as a result of the detected glare.

According to another aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface and a second electrode layer is located on the third surface. A photodiode light sensor is configured to detect a glare from a light, and a control system is configured to adjust the applied electrical potential to the electro-optic medium by the first and second electrodes as a result of the detected glare.

According to yet another aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface and a second electrode layer is located on the third surface. An array of photodiodes are located within a conductive medium configured to detect a glare from a light. The conductive medium is electrically isolated from the first and second electrodes. A control system is configured to adjust the applied electrical potential to the electro-optic medium by the first and second electrodes as a result of the detected glare.

These and other features, advantages, and objects of the present invention will be further understood and appreciated by those skilled in the art by reference to the following specification, claims, and appended drawings.

DETAILED DESCRIPTION

Figure 1:
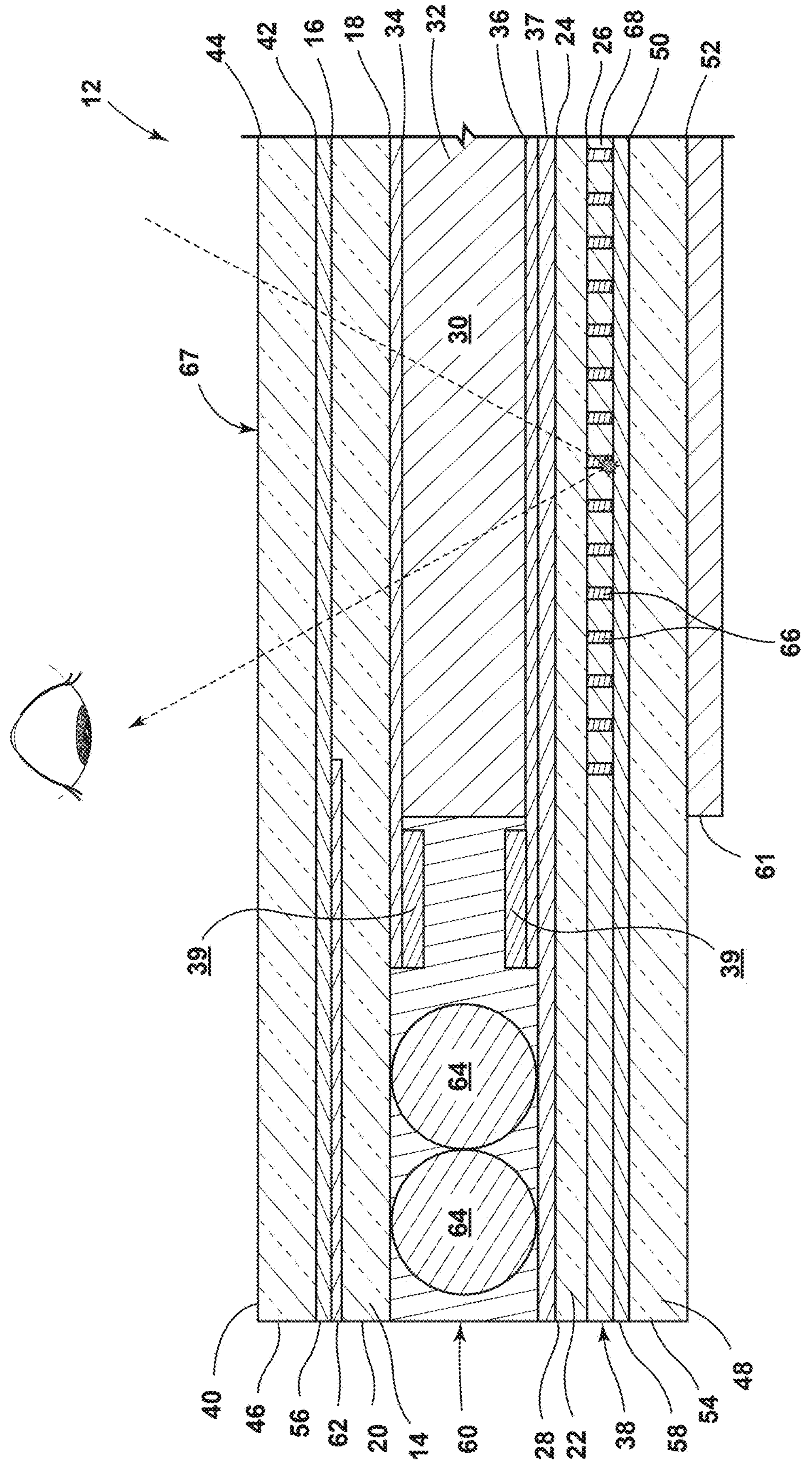
FIG. 1 is a cross-sectional view of an electro-optic assembly, according to one aspect of the present disclosure.

The present illustrated embodiments reside primarily in combinations of method steps and apparatus components related to an electro-optic assembly including a micro-photodiode light sensor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal,” and derivatives thereof shall relate to the disclosure as oriented in FIG. 1. Unless stated otherwise, the term “front” shall refer to a surface of the device closest to an intended viewer, and the term “rear” or “behind” shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With initial reference to FIG. 1, reference numeral 12 generally designates an electro-optic assembly. The electro-optic assembly 12 includes a first substrate 14 defining a first surface 16 that is oriented towards a front of the electro-optic assembly 12, a second surface 18, and a first peripheral edge 20. The first substrate 14 may be substantially transparent. The electro-optic assembly 12 also includes a second substrate 22 defining a third surface 24 that is oriented towards the front of the electro-optic assembly 12, a fourth surface 26, and a second peripheral edge 28. The second substrate 22 may be substantially transparent. The first and second substrates 14, 22 are disposed in a parallel and spaced apart relationship and define a cavity 30 therebetween. An electro-optic medium 32 at least partially fills the cavity 30 and is configured to change a degree of transmissiveness as a result of an applied electrical potential. The electro-optic medium 32 may be a solution-phase or solid state, electro-chromic medium. A first electrode layer 34 may be disposed on the second surface 18 of the first substrate 14 and a second electrode layer 36 may be disposed on the third surface 24 of the second substrate 22. In other words, the first electrode layer 34 and the second electrode layer 36 may be located on internal surfaces of the first and second substrates 14, 22 to at least partially delimit the cavity 30 and interface with the electro-optic medium 32. A reflective element 37 is disposed behind the electro-optic medium 32, opposite the first substrate 14 (e.g., on the third surface 24). A photodiode light sensor 38 is configured to detect a glare from a light, and a control system 100 (e.g., a processor 104) is configured to adjust the applied electrical potential to the electro-optic medium 32 by the first and second electrodes 34, 36 as a result of the detected glare.

The first electrode layer 34 and the second electrode layer 36 may be formed by electrically conductive transparent materials, including, but not limited to, a transparent conducting film (e.g., indium tin oxide (ITO), F: SnO2, ZnO, IZO), insulator/metal/insulator stack "IMI Structures", carbon (graphene and/or graphite), and/or a conductive metal mesh (e.g., nanowires). In various examples, the electro-optic medium 32 may include at least one solvent, at least one anodic material, and at least one cathodic material. Typically, both of the anodic and cathodic materials are electroactive and at least one of them may be electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference.

An electric bus 39 may at least partially travel along a peripheral edge of the cavity 30. For example, the electric bus 39 may include a conductive adhesive, tape, and/or the like, that may include a higher electric conductivity than one of or both of the first electrode layer 34 and the second electrode layer 36. The electric bus 39 may be placed on an internal surface (e.g., a surface that faces towards the cavity 30) of the first electrode layer 34 and/or the second electrode layer 36 or the electric bus 39 may be placed on an outer surface (e.g., a surface that faces away from the cavity 30) of the first electrode layer 34 and/or the second electrode layer 36. In some instances, the electric bus 39 may transverse an entire perimeter of the cavity 30 or may be localized to one or more discrete locations.

With continued reference to FIG. 1, the electro-optic assembly 12 may include a third substrate 40 defining a fifth surface 42, a sixth surface 44 opposite the fifth surface 42, and a third peripheral edge 46. The third substrate 40 may be substantially transparent. The electro-optic assembly 12 may also include a fourth substrate 48 defining a seventh surface 50, an eighth surface 52 opposite the seventh surface 50, and a fourth peripheral edge 54. The fourth substrate 48 may be substantially transparent. In some instances, a first laminate layer 56 may be located between the third substrate 40 and the first substrate 14 and a second laminate layer 58 may be located between the fourth substrate 48 and the second substrate 22. The first and second laminate layers 56, 58 may comprise an elastic polymer ("EVA") including, but not limited to, at least one of thermoplastic polyurethane ("TPU"), polyvinyl butyral ("PVB"), and/or the like. The third substrate 40 may be located outwardly from the first substrate 14 (e.g., away from the cavity 30 and facing towards the first surface 16), and the fourth substrate 48 may be located outwardly from the second substrate 22 (e.g., away from the cavity 30 and facing towards the third surface 24). One or more of the substrates 14, 22, 40, 48 may comprise glass (e.g., soda-lime glass or borosilicate glass), plastics, and/or the like.

The electro-optic assembly 12 includes a primary seal 60. The primary seal 60 may include a substantially continuous line outlining a periphery of the cavity 30 to retain the electro-optic medium 32 between the first substrate 14 and the second substrate 22 in an inboard direction. The primary seal 60, therefore, may define a transmission perimeter of the electro-optic medium 32. In other words, the transmission perimeter delimits the shape of the electro-optic assembly 12 that can change transmissibility. The primary seal 60 may have a seal medium, such as an epoxy, and a plurality of first spacer elements 64 may be coupled to (e.g., encapsulated, semi-encapsulated, adhered to, or combinations thereof) the seal medium. In some embodiments, the primary seal 60 may substantially cover and/or be aligned with the electric bus 39. In some embodiments, the electro-optic assembly 12 may include a display 61, for example, the electro-optic assembly 12 may be configured as a full display mirror.

A concealment layer 62 may be located on one or more of the substrates 14, 22, 40, 48 to cover the primary seal 60 from end-consumer view (e.g., in a direction of the front surface). The concealment layer 62 is illustrated as being raised from the substrates 14, 22, however, it should be appreciated that the concealment layer 62 may be formed into or integral with any of the substrates 14, 22, 40, 48 so as to remain substantially flush therewith. The concealment layer 62 covers visibility of the primary seal 60 in a direction from the second surface 18 opposite the cavity 30 and in a direction from the third surface 24 opposite the cavity 30. In other words, the concealment layer 62 may be located on the first substrate 14 or third substrate 40 and the second substrate 22 or fourth substrate 48, with the primary seal 60 sandwiched therebetween. The concealment layer 62 may be a glass frit that is integral with one or more of the substrates 14, 22, 40, 48. In other embodiments, the concealment layer 62 may be non-integral. In some embodiments, the concealment layer 62 may be reflective (e.g., a chrome ring), opaque, and/or the like. The concealment layer 62 may cover the entirety or part of the primary seal 60.

With continued reference to FIG. 1, the photodiode light sensor 38 includes an array of photodiodes 66 or micro-photodiodes 66. The micro-photodiodes 66 may be sized and arranged to be substantially transparent (e.g., non-detectable) to a user. The micro-photodiodes 66 receive power via a conductive intermediary 68. The conductive intermediary 68 may include a conductive film (e.g., indium tin oxide (ITO), F: SnO2, ZnO, IZO), IMI Structures, carbon (graphene and/or graphite), a conductive metal mesh, and/or nanowires) or a non-conductive film and a series of a conductive traces. The conductive intermediary 68 will generally be electrically isolated from the electrode layer 34, 36 and the electro-optic medium 32. It should be appreciated that, in some embodiments, the electro-optic assembly 12 may not include the third and fourth substrates 40, 48. As will be described in greater detail below, the array of micro-photodiodes 66 may extend across substantially the entirety of a viewable area 67 (e.g., the transmission perimeter) or may, alternatively, be confined within discrete localized regions of the viewable area 67. The array of micro-photodiodes 66 may further be located in various locations relative to a direction between the front (first surface 16 or sixth surface 44) and the rear (fourth surface 26 or eighth surface 52) of the electro-optic assembly 12.

Figure 2:
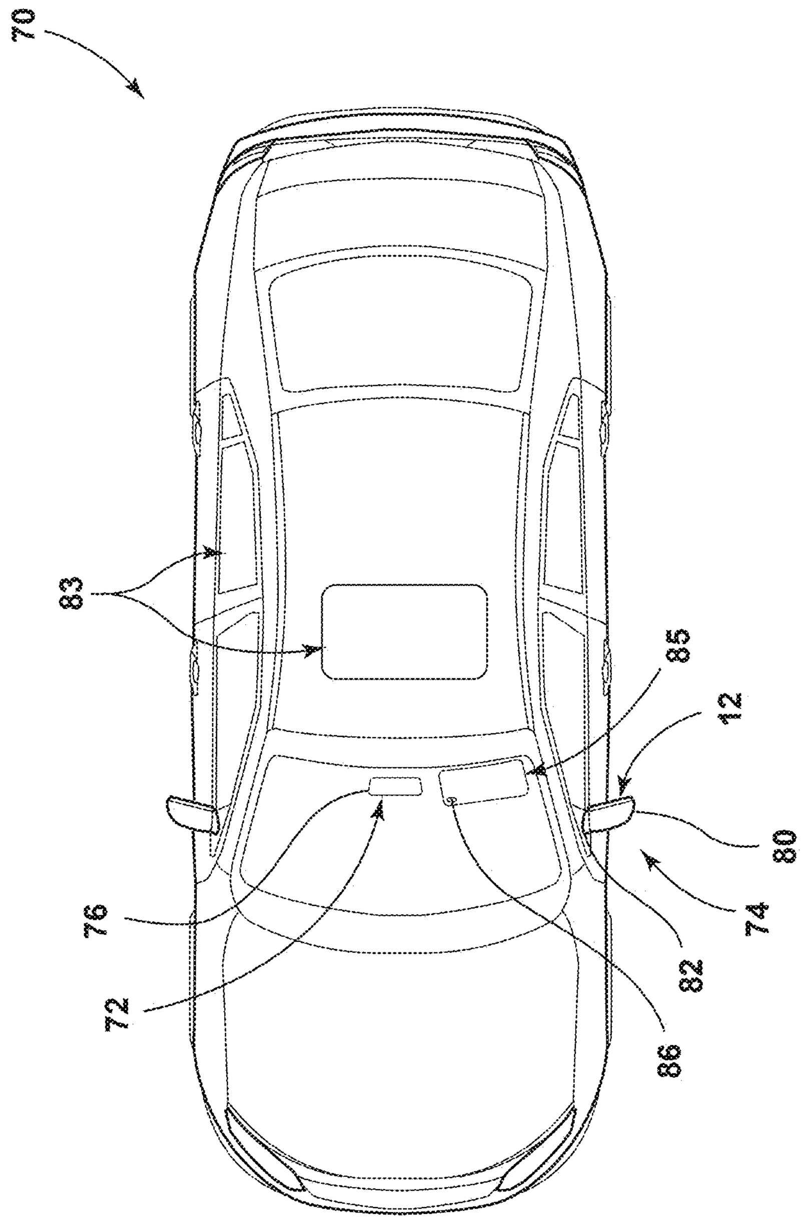
FIG. 2 is a top view of a vehicle incorporating an electro-optic assembly, according to one aspect of the present disclosure.
Figure 3:
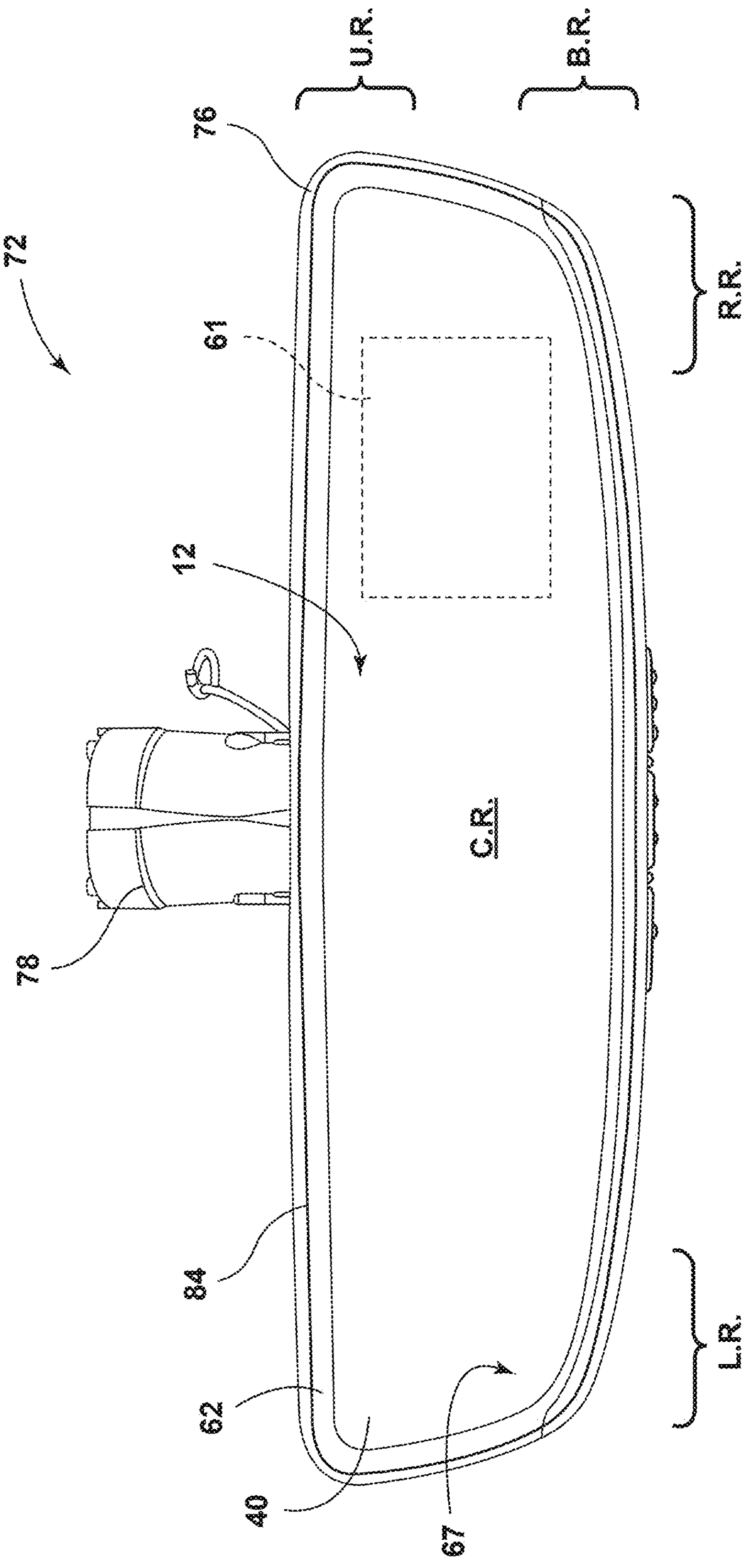
FIG. 3 is a front view of a rearview mirror incorporating an electro-optic assembly, according to one aspect of the present disclosure.

With reference now to FIGS. 2 and 3, the electro-optic assembly 12 may be incorporated into a variety of structures. For example, the electro-optic assembly 12 may be incorporated into a transportation vessel such as a vehicle 70, an airplane (e.g., front window or passenger windows), a water vessel (e.g., a cruise liner, a ship, boat, and/or the like), a building (e.g., windows within the building), a hybrid virtual reality headset (e.g., in a goggle portion), and/or the like. More particularly, the electro-optic assembly 12 may be incorporated into a rearview mirror 72 (e.g., a full display mirror or a more traditional mirror containing the electro-optic assembly 12, for example, without the display 61) or a side mirror 74. The rearview mirror 72 may include a rearview housing 76 that supports the electro-optic assembly 12 and a rearview mounting member 78 that is configured to mount the rearview housing 76 to an interior cabin of the vehicle 70 (FIG. 3). The side mirror 74, on the other hand, may include a side mirror housing 80 that supports the electro-optic assembly 12 and a side mirror mounting member 82 that is configured to mount the side mirror housing 80 to an exterior surface of the vehicle 70. In other embodiments, the electro-optic assembly 12 may be implemented in a window, such as a sunroof 83 or any other window. In such embodiments, it is contemplated that the electro-optic assembly 12 may not include the reflective element 37. The array of micro-photodiodes 66 may be located in various locations within the viewable area 67 (e.g., the transmission perimeter). For example, the array of micro-photodiodes 66 may cover substantially the entire viewable area 67 as defined by a bezel 84 of the rearview housing 76.

In still further embodiments, the electro-optic assembly 12 may be implemented in a visor assembly 85, such as a sun visor. In such embodiments, it is contemplated that at least one sensor 86 (e.g., the photodiode light sensor 38) may be connected to an exterior of the visor assembly and the array of micro-photodiodes 66 may be located within the visor assembly 85 (e.g., with a line of vision between a user and the environment) to selectively darken. The at least one sensor 86 (e.g., the photodiode light sensor 38) may include a sensor coupled to a front surface of the visor assembly and a sensor coupled to a rear surface of the visor assembly. In this manner, the at least sensor 86 (e.g., the photodiode light sensor 38) is oriented towards the environment when it is articulated towards the windshield and side windows. However, it should be appreciated that the at least one sensor 86 (e.g., the photodiode light sensor 38) may be located in and/or on other locations of the visor assembly 85 in addition or alternatively to the front and rear surfaces.

With reference to FIG. 3, various locations of the photodiodes 66 (e.g., the micro-photodiodes 66) are depicted in reference to the rearview mirror 72, however, it should be appreciated that the regions of the photodiodes 66 (e.g., the micro-photodiodes 66) may also apply to the other structures. For example, the same regions may apply to the side mirror 74, the window, such as the sunroof 83, any other window, other types of transportation vessels, buildings, hybrid virtual reality headsets, the visor assembly 85, and/or the like. In some embodiments, the array of micro-photodiodes 66 may be located and confined within an upper region ("U.R.") of the viewable area 67. In other embodiments, the array of micro-photodiodes 66 may be located and confined within a bottom region ("B.R.") of the viewable area 67. In some embodiments, the array of micro-photodiodes 66 may be located and confined within a left region ("L.R.") or a right region ("R.R."). In other embodiments, the array of micro-photodiodes 66 may be located in a central region ("C.R"). In still other embodiments, the array of micro-photodiodes 66 may be located in two or more of the regions U.R., B.R., L.R., and C.R. In some embodiments, the array of micro-photodiodes 66 may cover substantially the entire viewable area 67 except for the display 61. In some embodiments, photodiodes 66 cover substantially the entire viewable area 67 except for the display 61 and micro-photodiodes 66 cover substantially the entire display 61.

Figure 4:
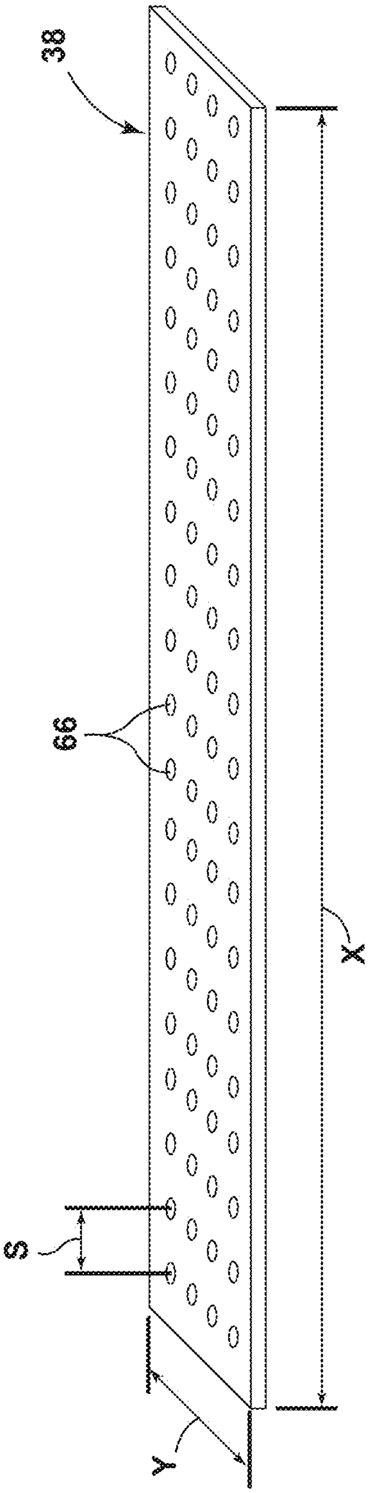
FIG. 4 is a perspective view of a photodiode light sensor, according to one aspect of the present disclosure.
Figure 5:
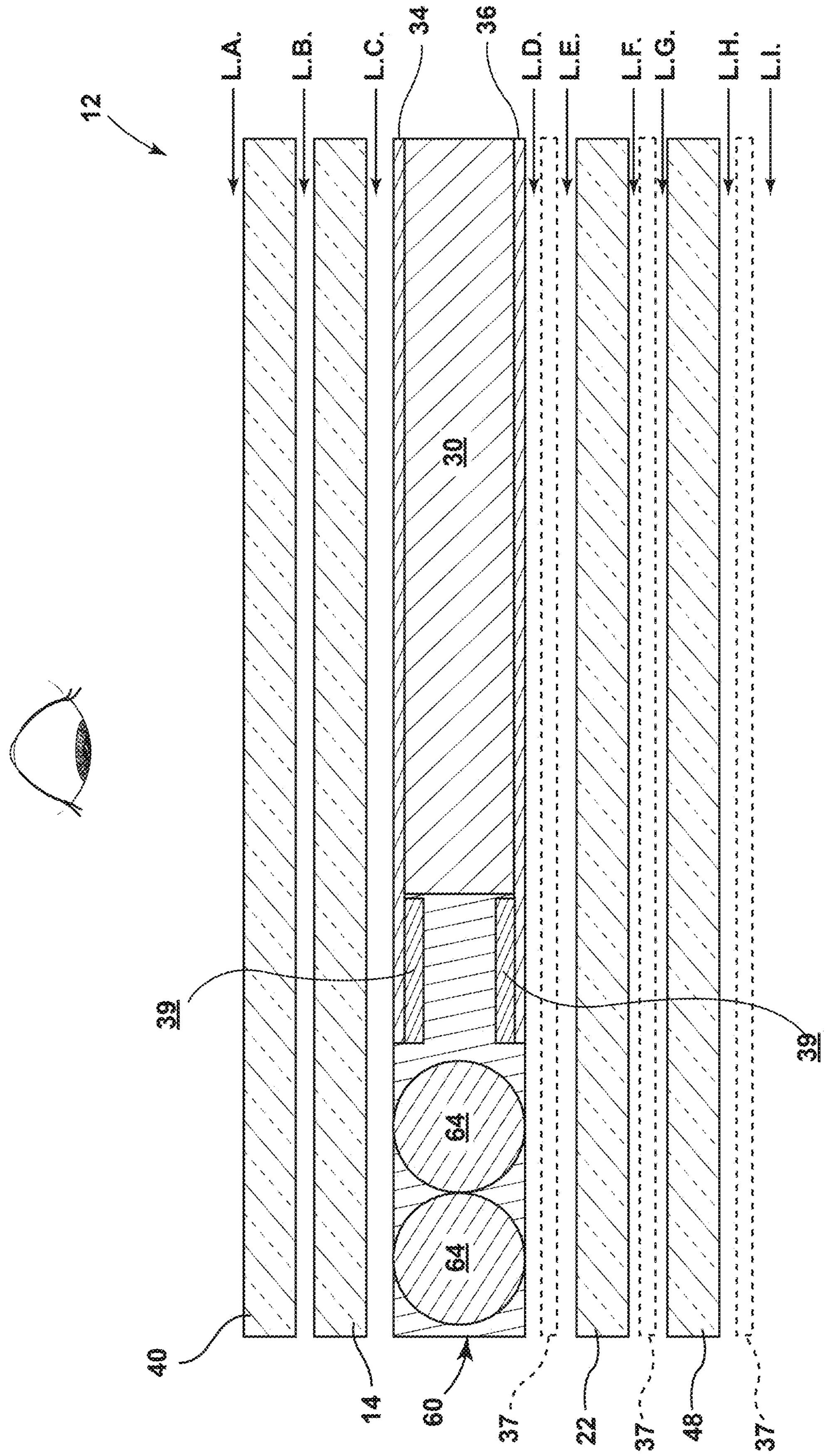
FIG. 5 is a cross-sectional view of an electro-optic assembly in a disassembled condition, according to one aspect of the present disclosure.

With reference to FIGS. 4 and 5, the micro-photodiodes 66 may be located in a pattern with spacing "S" along a length "X" and a height "Y" of the viewable area 67 and/or region U.R., B.R., L.R., and/or C.R. The spacing S may be uniform or non-uniform and the pattern may likewise be uniform or non-uniform. For example, the pattern may include uniform rows and columns, may be a hexagonal array, a non-uniform pattern and/or the like. In some embodiments, the C.R. may include a higher density (e.g., smaller spacing S) of micro-photodiodes 66 than one, more, or each of outer regions U.R., B.R., and L.R. Alternatively, the C.R. may include a lower density (e.g., greater spacing S) of micro-photodiodes 66 than one, more, or each of outer regions U.R., B.R., and L.R. In some embodiments, the display 61 may include a lower density (e.g., greater spacing S) of micro-photodiodes 66 than one, more, or each of the other regions U.R., B.R., L.R., and C.R.

As best illustrated in FIG. 5, the photodiode light sensor 38 and the reflective element 37 may be located in various levels with respect to the substrates 14, 22, 40, 48. For example, the reflective element 37 may be located behind the electro-optic medium 32 and may be located in the regions indicated by dashed lines (e.g., the third surface 24, the fourth surface 26, or the eighth surface 52). As it relates to the photodiode light sensor 38, it may be located on any surface relative to the substrates 14, 22, 40, 48 as generally indicated by references L.A.-L.I. In embodiments where the photodiode light sensor 38 is located on the second surface 18 or the third surface 24, an isolation layer (not shown) may be located between the photodiode light sensor 38 and the electrode layers 34, 36 to electrically isolate the photodiode light sensor 38 (e.g., the conductive intermediary 68) from the electrode layers 34, 36.

Figure 6:
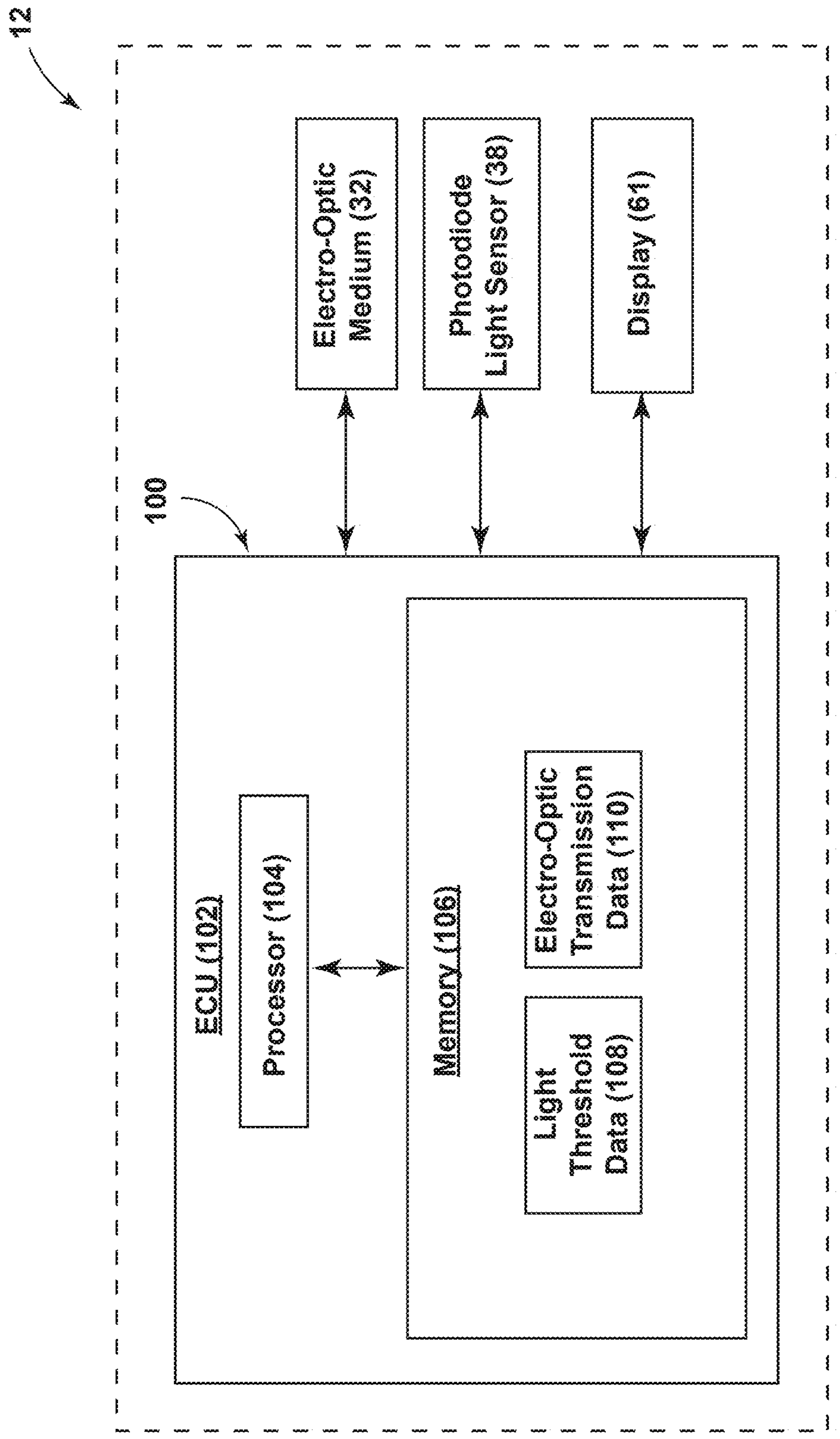
FIG. 6 is a schematic view of a control system of the mirror assembly, according to one aspect of the present disclosure.

With reference now to FIG. 6, the control system 100 of the electro-optic assembly 12 is illustrated. The control system 100 may include an electronic control unit (ECU) 102 configured to perform the functions and method steps as described herein. The ECU 102 may include the processor 104 and a memory 106. The processor 104 may include any suitable processor 104. Additionally, or alternatively, the ECU 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, the memory 106 may include a non-transitory memory, flash memory, semiconductor (solid state) memory, and/or the like. The memory 106 may include Random Access Memory (RAM), a Read-Only Memory (ROM), or a combination thereof. The memory 106 may include instructions that, when executed by the processor 104, cause the processor 104 to, at least, perform the functions and method steps as described herein. The electro-optic medium 32, the photodiode light sensor 38, and the display 61 may, therefore, be controlled, receive inputs and power, and/or transmit inputs to and from the ECU 102. The ECU 102 may receive and/or the memory 106 may save light threshold profile data 108 and electro-optic transmission data 110. In this manner, the control system 100 (e.g., the processor 104) may be configured to receive inputs from the photodiode light sensor 38 that relate to an amount of detected light (e.g., glare), compare the amount of detected light (e.g., glare) with the light threshold profile data 108, and electro-activate the electro-optic medium 32 if the detected light is above a threshold. In some embodiments, the light threshold profile data 108 may include a single threshold corresponding to electro-activating the electro-optic medium 32 to reduce glare. In other embodiments, the light threshold profile data 108 may include a plurality of thresholds corresponding to electro-activating the electro-optic medium 32 to different degrees of transmissiveness to reduce glare optimally relative to the amount of detected lighting. In such embodiments, the electro-optic transmission data 110 may include a plurality of applied voltages corresponding to the amount of detected light, wherein each applied voltage increases as a result of an increase of detected light above a subsequent (i.e., higher) threshold. In some embodiments, the control system 100 may in addition or alternatively include application-specific integrated circuits (ASIC), or other circuitry configured to perform instructions, computations, and control various input/output signals to control the control system 100.

The disclosure herein is further summarized in the following paragraphs and is further characterized by combinations of any and all of the various aspects described therein.

According to one aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface and a second electrode layer is located on the third surface. A reflective element is disposed behind the electro-optic medium, opposite the first substrate. A photodiode light sensor is configured to detect a glare from a light, and a control system is configured to adjust the applied electrical potential to the electro-optic medium by the first and second electrodes as a result of the detected glare.

According to another aspect, a photodiode light sensor includes an array of micro-photodiodes.

According to yet another aspect, an array of micro-photodiodes is substantially transparent.

According to still yet another aspect, an array of micro-photodiodes are electrically insulated from the first electrode layer, the second electrode layer, and the electro-optic medium.

According to another aspect, an array of micro-photodiodes is located on a conductive film.

According to yet another aspect, a photodiode light sensor is located in front of a reflective element in a direction towards a first surface.

According to still yet another aspect, a photodiode light sensor is located behind a reflective element in a direction away from the first substrate.

According to another aspect, a rearview mirror includes the electro-optic device.

According to yet another aspect, a display located behind a photodiode light sensor in a direction away from a first substrate.

According to still yet another aspect, a seal defines a viewable area and a photodiode light sensor substantially covers the entire viewable area.

According to another aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface and a second electrode layer is located on the third surface. A photodiode light sensor is configured to detect a glare from a light, and a control system is configured to adjust the applied electrical potential to the electro-optic medium by the first and second electrodes as a result of the detected glare.

According to another aspect, a photodiode light sensor includes an array of micro-photodiodes.

According to yet another aspect, an array of micro-photodiodes is substantially transparent.

According to still yet another aspect, a window includes the electro-optic device.

According to another aspect, a sunroof of a vehicle includes the electro-optic device.

According to yet another aspect, micro-photodiodes are located in a uniform pattern.

According to still yet another aspect, the uniform pattern includes equal spacing between the micro-photodiodes.

According to yet another aspect of the present disclosure, an electro-optic assembly includes a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. An electro-optic medium is located in the cavity and is configured to change a degree of transmissiveness as a result of an applied electrical potential. A first electrode layer is located on the second surface and a second electrode layer is located on the third surface. An array of photodiodes are located within a conductive medium configured to detect a glare from a light. The conductive medium is electrically isolated from the first and second electrodes. A control system is configured to adjust the applied electrical potential to the electro-optic medium by the first and second electrodes as a result of the detected glare.

According to another aspect, a conductive medium is selected from a group comprising at least one of a conductive film, an IMI Structure, a conductive metal mesh, and a non-conductive film with a series of conductive traces.

According to yet another aspect, photodiodes are micro-photodiodes and an array of micro-photodiodes is substantially transparent.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An electro-optic assembly comprising:
- a first substrate having a first surface and a second surface opposite the first surface;
- a second substrate having a third surface and a fourth surface opposite the third surface, the first and second substrates disposed in a parallel and spaced apart relationship so as to define a cavity therebetween, the second and third surfaces facing each other;
- an electro-optic medium located in the cavity and configured to change a degree of transmissiveness as a result of an applied electrical potential;
- a first electrode layer located on the second surface and a second electrode layer located on the third surface;
- a reflective element disposed behind the electro-optic medium, opposite the first substrate;
- a photodiode light sensor configured to detect a glare from a light, the photodiode light sensor located in front of the reflective element in a direction towards the first surface; and
- a control system configured to adjust the applied electrical potential to the electro-optic medium by the first and second electrodes as a result of the detected glare.

2. The electro-optic assembly of claim 1, wherein the photodiode light sensor includes an array of micro-photodiodes.

3. The electro-optic assembly of claim 2, wherein the array of micro-photodiodes is substantially transparent.

4. The electro-optic assembly of claim 2, wherein the array of micro-photodiodes are electrically insulated from the first electrode layer, the second electrode layer, and the electro-optic medium.

5. The electro-optic assembly of claim 2, wherein the array of micro-photodiodes is located on a conductive film.

6. The electro-optic assembly of claim 1, wherein the photodiode light sensor is located behind the reflective element in a direction away from the first substrate.

7. A rearview mirror comprising the electro-optic device of claim 1.

8. The electro-optic assembly of claim 7, further including a display located behind the photodiode light sensor in a direction away from the first substrate.

9. The electro-optic assembly of claim 8, further including a seal defining a viewable area and the photodiode light sensor substantially covers the entire viewable area.

10. An electro-optic assembly comprising:

a first substrate having a first surface and a second surface opposite the first surface;

a second substrate having a third surface and a fourth surface opposite the third surface, the first and second substrates disposed in a parallel and spaced apart relationship so as to define a cavity therebetween, the second and third surfaces facing each other;

an electro-optic medium located in the cavity and configured to change a degree of transmissiveness as a result of an applied electrical potential;

a first electrode layer located on the second surface and a second electrode layer located on the third surface;

a photodiode light sensor including an array of micro-photodiodes that is substantially transparent and configured to detect a glare from a light; and a control system configured to adjust the applied electrical potential to the electro-optic medium by the first and second electrodes as a result of the detected glare.

11. A window comprising the electro-optic device of claim 10.

12. The electro-optic assembly of claim 11, wherein the window is a sunroof of a vehicle.

13. The electro-optic assembly of claim 10, wherein the micro-photodiodes are located in a uniform pattern.

14. The electro-optic assembly of claim 13, wherein the uniform pattern includes equal spacing between the micro-photodiodes.

15. An electro-optic assembly comprising:

a first substrate having a first surface and a second surface opposite the first surface;

a second substrate having a third surface and a fourth surface opposite the third surface, the first and second substrates disposed in a parallel and spaced apart relationship so as to define a cavity therebetween, the second and third surfaces facing each other;

an electro-optic medium located in the cavity and configured to change a degree of transmissiveness as a result of an applied electrical potential;

a first electrode layer located on the second surface and a second electrode layer located on the third surface;

an array of micro-photodiodes within a conductive medium configured to detect a glare from a light, wherein the conductive medium is electrically isolated from the first and second electrodes and the array of micro-photodiodes is substantially transparent; and a control system configured to adjust the applied electrical potential to the electro-optic medium by the first and second electrodes as a result of the detected glare.

16. The electro-optic assembly of claim 15, wherein the conductive medium is selected from a group comprising at least one of a conductive film, an IMI Structure, a conductive metal mesh, and a non-conductive film with a series of conductive traces.

* * * * *